(12) United States Patent
Kullen et al.

(10) Patent No.: US 8,328,203 B2
(45) Date of Patent: Dec. 11, 2012

(54) SEALING SYSTEM FOR EXHAUST-GAS LINES

(75) Inventors: Wilhelm Kullen, Hülben (DE); Martin Kehr, Bad Urach (DE); Ulrich Werz, Dettingen/Erms (DE)

(73) Assignee: Elringklinger AG, Dettingen/Erms (DE)

( * ) Notice: Subject to any disclaimer, the term of this patent is extended or adjusted under 35 U.S.C. 154(b) by 206 days.

(21) Appl. No.: 12/309,952

(22) PCT Filed: Sep. 1, 2007

(86) PCT No.: PCT/EP2007/007644
§ 371 (c)(1),
(2), (4) Date: Feb. 4, 2009

(87) PCT Pub. No.: WO2008/037330
PCT Pub. Date: Apr. 3, 2008

(65) Prior Publication Data
US 2009/0322039 A1    Dec. 31, 2009

(30) Foreign Application Priority Data

Sep. 27, 2006  (DE) .......................... 10 2006 045 584

(51) Int. Cl.
*F16L 17/06* (2006.01)
*F16J 15/02* (2006.01)
(52) U.S. Cl. ........................................ 277/608; 277/647
(58) Field of Classification Search .................... 277/608, 277/626, 627, 647, 650, 637, 652, 653
See application file for complete search history.

(56) References Cited

U.S. PATENT DOCUMENTS

| | | | | |
|---|---|---|---|---|
| 2,733,969 | A | * | 2/1956 | Polk ............................... 277/558 |
| 3,058,750 | A | * | 10/1962 | Taylor ............................ 277/312 |
| 3,132,870 | A | * | 5/1964 | Pschera ......................... 277/610 |

(Continued)

FOREIGN PATENT DOCUMENTS

DE    1 944 582    1/1972

(Continued)

OTHER PUBLICATIONS

Surrounds. 2011. In Merriam-Webster Online Dictionary. Retrieved Mar. 18, 2011, from http://www.merriam-webster.com/dictionary/surrounds.*

*Primary Examiner* — Vishal Patel
(74) *Attorney, Agent, or Firm* — Roylance, Abrams, Berdo and Goodman L.L.P.

(57) ABSTRACT

A sealing system, in particular for sealing multiple part exhaust-gas lines for an internal combustion engine, has at least a first flange part (9) and a second flange part (11) guiding a flow of heat (5). The flange parts (9, 11) delimit a receiving space (33) for at least one sealing element (31) between them and adjoin one another. Each flange part forms an outwardly projecting annular flange (13) facing away from the flow of heat (5), and extending transversely with respect to the heat flow. Chambering of the receiving space (33) is formed for the sealing element (31) by an annular groove (45) open at the end face (17) of at least one flange part (11) and recessed axially into said end face (17). At least one covering element (47) is arranged in the annular groove (45) and provides thermal shielding for the sealing element (31) at least on its side facing the end face (17) of the flange part (11).

20 Claims, 1 Drawing Sheet

U.S. PATENT DOCUMENTS

| | | | | |
|---|---|---|---|---|
| 3,140,342 | A | * | 7/1964 | Avery et al. .................. 174/356 |
| 3,217,922 | A | * | 11/1965 | Glasgow ....................... 220/378 |
| 3,298,794 | A | * | 1/1967 | Mikesell, Jr. et al. ......... 422/242 |
| 3,418,001 | A | * | 12/1968 | Rentschler et al. ........... 277/589 |
| 3,561,776 | A | * | 2/1971 | Wilson ......................... 277/647 |
| 3,595,588 | A | * | 7/1971 | Rode ............................ 277/650 |
| 3,820,799 | A | * | 6/1974 | Abbes et al. ................. 277/647 |
| 3,869,132 | A | * | 3/1975 | Taylor et al. ................. 277/608 |
| 3,918,725 | A | * | 11/1975 | Dryer ........................... 277/612 |
| 4,188,037 | A | * | 2/1980 | Abbes et al. ................. 277/317 |
| 4,218,067 | A | * | 8/1980 | Halling ......................... 277/605 |
| 4,261,584 | A | * | 4/1981 | Browne et al. ............... 277/647 |
| 4,444,403 | A | * | 4/1984 | Morris .......................... 277/336 |
| 4,445,694 | A | * | 5/1984 | Flaherty ....................... 277/312 |
| 4,477,085 | A | * | 10/1984 | Bridges et al. ................ 277/322 |
| 4,477,091 | A | * | 10/1984 | Adamek ....................... 277/322 |
| 4,603,892 | A | | 8/1986 | Abbes et al. |
| 4,747,624 | A | * | 5/1988 | Faber et al. ................... 285/187 |
| 4,850,521 | A | * | 7/1989 | Servant ........................ 277/614 |
| 4,915,925 | A | * | 4/1990 | Chung ....................... 423/447.1 |
| 5,076,591 | A | * | 12/1991 | Gentile ......................... 277/642 |
| 5,112,664 | A | * | 5/1992 | Waterland, III ................ 428/76 |
| 5,511,828 | A | * | 4/1996 | Kurek et al. .................... 285/49 |
| 5,558,344 | A | * | 9/1996 | Kestly et al. .................. 277/608 |
| 5,799,953 | A | * | 9/1998 | Henderson ................... 277/554 |
| 6,517,086 | B1 | | 2/2003 | Jamrog |
| 6,540,234 | B1 | * | 4/2003 | Atkinson et al. .............. 277/612 |
| 6,755,422 | B2 | * | 6/2004 | Potter ........................... 277/652 |
| 7,048,201 | B2 | * | 5/2006 | Kerchner et al. ................ 237/79 |
| 7,128,323 | B2 | * | 10/2006 | Iguchi et al. .................. 277/644 |
| 7,218,323 | B1 | * | 5/2007 | Halmshaw et al. ........... 345/424 |
| 7,316,762 | B2 | * | 1/2008 | Lah ............................... 202/242 |
| 7,845,649 | B2 | * | 12/2010 | Kowalczyk .................... 277/641 |
| 2003/0080519 | A1 | * | 5/2003 | Kerchner ....................... 277/637 |

FOREIGN PATENT DOCUMENTS

| | | |
|---|---|---|
| DE | 29 09 223 A1 | 10/1979 |
| DE | 198 16 862 A1 | 10/1999 |
| DE | 10 2004 060 845 A1 | 6/2006 |
| EP | 1 099 835 A2 | 5/2001 |
| JP | 11 210 886 A1 | 8/1999 |

* cited by examiner

SEALING SYSTEM FOR EXHAUST-GAS LINES

FIELD OF THE INVENTION

The invention relates to a sealing system, in particular for sealing of multipart exhaust-gas lines for an internal combustion engine, having at least first and second flange parts. The flange parts conduct a heat flow and delimit a receiving space for at least one sealing element between them.

BACKGROUND OF THE INVENTION

Sealing systems of this type are known. DE 10 2004 060 845 A1 shows, for example, such a sealing system for the exhaust gas line of a reciprocating piston engine. The sealing element is a metallic gasket in the form of a profile body with a C-shaped profile cross section. Sealing elements on exhaust gas lines are subject to very high temperatures which can exceed 600° C. Even if materials are used with properties that are suitable with respect to heat resistance, the sealing elements at the prevailing high operating temperatures lose their functional properties required for sealing. Especially the elasticity of the sealing elements is reduced by creep processes due to overly high thermal loads.

SUMMARY OF THE INVENTION

Accordingly, an object of the invention is to provide a sealing system which, when used in a hot gas region, ensures reliable sealing even when high temperatures occur on the exhaust gas lines to be sealed.

According to the invention, this object is basically achieved by a sealing system having flange parts to be sealed against one another and to form an annular flange facing away from the heat flow and projecting transversely to the heat flow to the outside. A chambering is formed for the sealing element. The material of the annular flange forms a certain thermal shielding of the sealing element relative to the heat flow. The sealing element chambered in an annular groove is additionally protected by a cover element within the annular groove forming thermal shielding at least on the side of the sealing element facing the end face of the flange part, i.e., on the open side of the annular groove which is thermally most heavily loaded. The sealing element is protected especially effectively against overly high thermal loads such that the system according to the invention can also be reliably used on exhaust gas lines which are thermally highly loaded.

Preferably, the cover element is a metallic annular body.

When there is an annular body in the form of a flat ring, it is preferably inserted such that it extends between the sealing element and the facing end face of the flange part, and thus, forms a thermal barrier on the region of the annular groove most heavily thermally loaded and in which the sealing element is chambered.

Instead of a flat annular body, the cover element can be formed by a profile ring having an arched profile or an angled profile.

In such embodiments the annular body is preferably inserted into the annular groove such that it surrounds the sealing element both on the side facing the end face and on the side facing another wall of the receiving space.

Especially good thermal shielding of the sealing element in such embodiments can be achieved when the cover element also surrounds the sealing element on the side nearest the heat flow, that is, on that side facing the radially inside wall of the annular groove.

The sealing element is preferably a molded ring seal, with a C-shaped or V-shaped profile cross section. In this case, the sealing element with the C-profile is preferably installed in the annular groove such that the profile is open radially to the inside, that is, towards the pressure side of the system.

Instead of a V-shaped or C-shaped profile cross section, the sealing element could also have a meandering profile cross section, in the form of a bellows solution in which several folds lying on top of one another form the cross section.

Alternatively, metal bead seals can be installed in the receiving space. In any case, the invention ensures thermal protection for the respective sealing element so that for metallic sealing elements of a material available for high temperature use, reliable sealing in hot gas regions is ensured. The annular shape for the sealing element can be circular or nearly circular. Furthermore, ring shapes are conceivable in the form of an oval or a rectangular shape, preferably with rounded corner regions. The respective annular groove must then preferably follow the pertinent ring shape of the sealing element.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
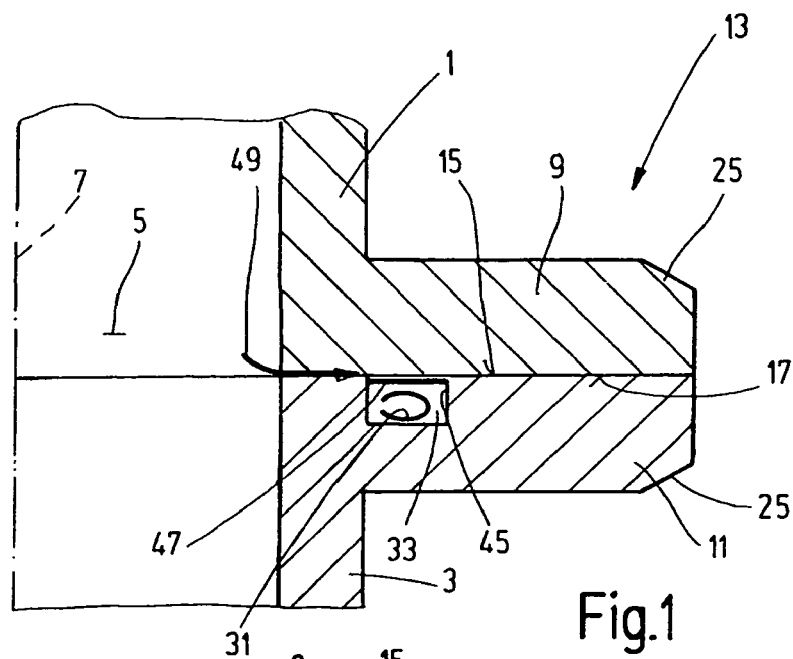
FIG. 1 is a side elevational view in section of adjacent line sections of an exhaust gas line, drawn highly schematically simplified, broken away and half-sided, the line sections being mutually sealed by a sealing system according to a first exemplary embodiment of the invention.

In the figures, a first line section and a second line section of an exhaust gas line or other hot fluid conduit are designated as 1 and 3, respectively. In the operation of the pertinent internal combustion engine, the exhaust gas line conducts an exhaust gas-heat flow 5 with a correspondingly high exhaust gas temperature. The line sections 1 and 3 are sealed against one another by the sealing system according to the invention and are to be connected to one another. Each line section has a flange part 9 and 11 respectively projecting radially to the outside relative to the axis 7 of the line. The flange parts 9 and 11 together form an annular flange 13 and have end faces 15 and 17 facing one another. To connect the line sections 1 and 3 to one another, the flange parts 9, 11 of the annular flange 13 are braced to one another by suitable clamping means which may be conventional and which are therefore not shown. For example, the clamping means could be a clamping ring pulled onto peripheral bevels 25 of the flange parts 9 and 11 (not shown).

The sealing element for sealing between the flange parts 9 and 11 is a metallic molded ring seal 31 with a C-shaped profile cross section. As indicated above, a molded ring seal with a different profile cross section or a bead seal or the like could be used. In any case, the sealing element is at least partially chambered and is enclosed in a receiving space 33 formed between the flange parts 9 and 11. As shown in the drawings, in the embodiments of FIGS. 1 to 3, the receiving space 33 is formed by an annular groove 45 machined and recessed in the axial direction in the flange part 11 from its end surface 17 and opening only on end face 17. The end face 15 of the flange part 9 closes the chamber for the molded ring seal 31.

According to the invention, additional heat protection for the molded ring seal 31 located in the receiving space 33 is a cover element 47 inserted into the annular groove 45. The cover element 47 forms a thermal barrier between the molded ring seal 31 and the thermally most heavily loaded region of the receiving space 33. In the embodiment of FIG. 1, the cover element 47 is formed by a flat metal ring inserted between the molded ring seal 31 and the end surface 17 bordering the end face 15 of the opposite flange part 9. As the flow arrow 49 indicates, this junction site is most heavily under the influence of the heat flow 5 so that the cover element 47 has the greatest protective effect in this position.

Figure 2:
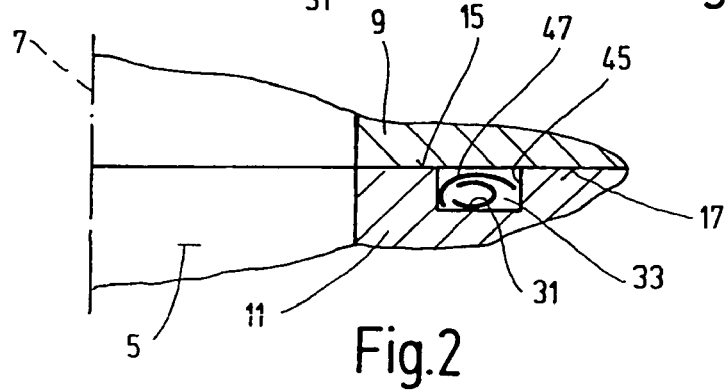
FIG. 2 is a half-side side elevational view in section of only the junction region of the adjacent flange parts of two line sections, according to a second exemplary embodiment of the sealing system of the invention.

In the embodiment of FIG. 2, instead of a flat ring the cover element 47 has an arched annular body installed in the annular groove 45 such that it shields not only that side of the molded ring seal 31 bordering the open side of the annular space 45 and forming a barrier there in the same manner as in the example of FIG. 1, but, moreover, with an arched region extends over the molded ring seal 31 such that it is also shielded relative to the radially inner wall of the annular groove 45, i.e., against the wall of the receiving space nearest the heat flow 5.

Figure 3:
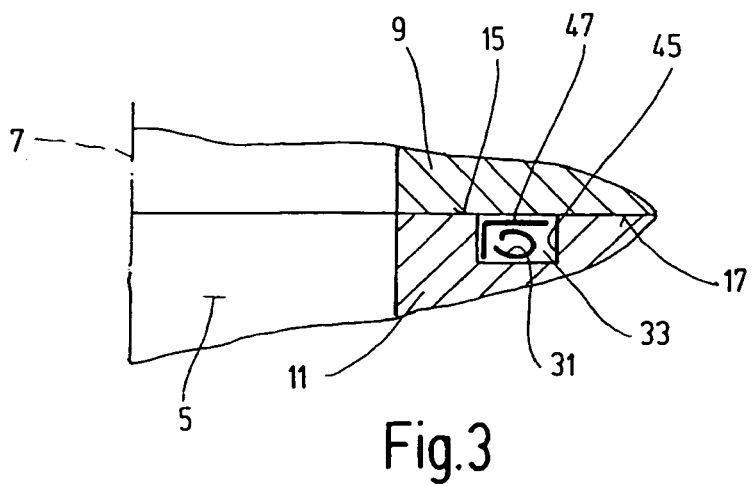
FIG. 3 is a half-side side elevational view in section of only the junction region of the adjacent flange parts of two line sections according to a third exemplary embodiment of the sealing system of the invention.

FIG. 3 illustrates another embodiment in which the cover element 47 likewise forms a shield on two sides of the molded ring seal 31. For this purpose, the cover element 47 is made as an angled profile ring. A profile leg, corresponding to the flat annular body of FIG. 1, extends along the junction site between the end faces 17 and 15. The angled other profile leg in corresponds to the arched profile part of the cover element 47 of FIG. 2 and forms the shielding relative to the wall of the receiving space 33 nearest the heat flow 5.

Instead of the illustrated forms of the cover element 47, other profile cross sections could be used. For example, a U profile surrounding the sealing element along three sides can be used. In any case, the cover element 47 is installed in the annular groove 45 such that the molded ring seal 31 is covered at least on the side facing the junction site between the end faces 15 and 17 of the flange parts 9 and 11. Preferably, in addition, the correspondingly shaped cover element 47 extends over the molded ring seal 31 on at least one other thermally endangered site.

While various embodiments have been chosen to illustrate the invention, it will be understood by those skilled in the art that various changes and modifications can be made therein without departing from the scope of the invention as defined in the appended claims.

What is claimed is:

1. A sealing system for hot fluid conduits, comprising:
   first and second hollow line sections for conducting a heat flow therethrough having first and second annular flange parts with first and second end faces, respectively, said flange parts being adjacent one another to form an annular flange projecting away and transversely from the heat flow, said first end face facing said second end face;
   a receiving space enclosed by said first flange part and formed by an axially recessed annular groove in said first flange part, said annular groove opening only on said first end face;
   a metallic sealing element wholly located in said annular groove, said sealing element having elasticity as a functional property required for sealing and being of a hollow cross-section profile; and
   at least one cover element received in said annular groove, having a metallic ring body and forming a thermal shield for said sealing element at least on a side thereof facing said first end face, said cover element being a flat annular body lying in a single plane only positioned between said first end face and said sealing element, extending completely over a side of said sealing element facing said second end face of said second flange, protecting said sealing element against reduction of the elasticity thereof and being detached from said sealing element.

2. A sealing system according to claim 1 wherein said first and second flange parts are part of a multipart exhaust line for an internal combustion engine.

3. A sealing system according to claim 1 wherein said sealing element comprises a molded ring seal having one of a C-shaped cross-sectional profile and a V-shaped cross-sectional profile.

4. A sealing system according to claim 1 wherein said sealing element comprises a molded ring seal having a C-shaped cross-sectional profile with a side opening facing a wall of said receiving space closest to the heat flow.

5. A sealing system for hot fluid conduits, comprising:
   first and second hollow line sections for conducting a heat flow therethrough, having first and second annular flange parts with first and second end faces, respectively, said flange parts being adjacent one another to form an annular flange projecting away and transversely from the heat flow, said first end face facing said second end face;
   a receiving space enclosed by said first flange part and formed by an axially recessed annular groove in said first flange part, said annular groove opening only on said first end face;
   a metallic sealing element wholly located in said annular groove, said sealing element having elasticity as a functional property required for sealing; and
   at least one cover element received in said annular groove, having a metallic ring body and forming a thermal shield for said sealing element at least on a side thereof facing said first end face, said cover element being an annular body with an arched profile positioned between said first end face and said sealing element, covering said sealing element on a side facing said first end face and on a side facing a wall of said receiving space, protecting said sealing element against reduction of the elasticity thereof and being detached from said sealing element.

6. A sealing system according to claim 5 wherein said first and second flange parts are part of a multipart exhaust line for an internal combustion engine.

7. A sealing system according to claim 5 wherein said sealing element comprises a molded ring seal having one of a C-shaped cross-sectional profile and a V-shaped cross-sectional profile.

8. A sealing system according to claim 5 wherein said sealing element comprises a molded ring seal having a C-shaped cross-sectional profile with a side opening facing a wall of said receiving space closest to the heat flow.

9. A sealing system according to claim 5 wherein said wall of said receiving space is closest to the heat flow.

10. A sealing system according to claim 5 wherein said sealing element is wholly located within said annular groove in said first flange part.

11. A sealing system according to claim 5 wherein said cover element has at least a portion thereof facing said second end face of said second flange.

12. A sealing system according to claim 5 wherein said sealing element is wholly located within said annular groove in said first flange part; and
said cover element extends completely over a side of said sealing element facing said second end face of said second flange.

13. A sealing system for hot fluid conduits, comprising:
first and second flange hollow line sections for conducting a heat flow therethrough having first and second annular flange parts with first and second end faces, respectively, and said flange parts being adjacent one another to form an annular flange projecting away and transversely from the heat flow, said first end face facing said second end face;
a receiving space enclosed by said first flange part and formed by an axially recessed annular groove in said first flange part, said annular groove opening only on said first end face;
a metallic sealing element received in said annular groove, said sealing element having elasticity as a functional property required for sealing; and
at least one cover element received in said annular groove, having a metallic ring body and forming a thermal shield for said sealing element at least on a side thereof facing said first end face, said cover element being an annular body with an angled, L-shaped cross-sectional profile positioned between said first end face and said sealing element, covering said sealing element on a side facing said first end face and on a side facing a wall of said receiving space, protecting said sealing element against reduction of the elasticity, thereof and being detached from said sealing element.

14. A sealing system according to claim 13 wherein said first and second flange parts are part of a multipart exhaust line for an internal combustion engine.

15. A sealing system according to claim 13 wherein said sealing element comprises a molded ring seal having a C-shaped cross-sectional profile with a side opening facing a wall of said receiving space closest to the heat flow.

16. A sealing system according to claim 13 wherein said sealing element comprises a molded ring seal having one of a C-shaped cross-sectional profile and a V-shaped cross-sectional profile.

17. A sealing system according to claim 13 wherein said wall of said receiving space is closest to the heat flow.

18. A sealing system according to claim 13 wherein said sealing element is wholly located within said annular groove in said first flange part.

19. A sealing system according to claim 13 wherein said cover element has at least a portion thereof facing said second end face of said second flange.

20. A sealing system according to claim 13 wherein said sealing element is wholly located within said annular groove in said first flange part; and
said cover element extends completely over a side of said sealing element facing said second end face of said second flange.

* * * * *